(12) United States Patent
Hatakeyama et al.

(10) Patent No.: US 11,231,507 B2
(45) Date of Patent: Jan. 25, 2022

(54) RADIATION MONITOR

(71) Applicant: HITACHI, LTD., Tokyo (JP)

(72) Inventors: Shuichi Hatakeyama, Tokyo (JP); Takahiro Tadokoro, Tokyo (JP); Yuichiro Ueno, Tokyo (JP); Yasushi Nagumo, Tokyo (JP); Katsunori Ueno, Tokyo (JP); Kouichi Okada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/059,535

(22) PCT Filed: May 16, 2019

(86) PCT No.: PCT/JP2019/019540
§ 371 (c)(1),
(2) Date: Nov. 30, 2020

(87) PCT Pub. No.: WO2019/239785
PCT Pub. Date: Dec. 19, 2019

(65) Prior Publication Data
US 2021/0208287 A1    Jul. 8, 2021

(30) Foreign Application Priority Data

Jun. 15, 2018   (JP) ............................. JP2018-114135

(51) Int. Cl.
*G01T 1/10* (2006.01)
*G01T 1/17* (2006.01)
(Continued)

(52) U.S. Cl.
CPC ................ *G01T 1/10* (2013.01); *G01T 1/023* (2013.01); *G01T 1/17* (2013.01); *G01T 1/2006* (2013.01)

(58) Field of Classification Search
CPC ......... G01T 1/10; G01T 1/2006; G01T 1/023; G01T 1/17
See application file for complete search history.

(56) References Cited

U.S. PATENT DOCUMENTS

| 8,405,035 B1* | 3/2013 | Nagarkar ............. G01T 1/2008 250/367 |
| 2006/0273258 A1* | 12/2006 | Kastalsky ............ G01T 1/2018 250/370.11 |

(Continued)

FOREIGN PATENT DOCUMENTS

| JP | 2008-051793 A | 3/2008 |
| JP | 2012-168009 A | 9/2012 |

(Continued)

OTHER PUBLICATIONS

International Search Report of PCT/JP2019/019540 dated Aug. 13, 2019.

*Primary Examiner* — Christine S. Kim
(74) *Attorney, Agent, or Firm* — Mattingly & Malur, PC

(57) ABSTRACT

A screw compressor includes a screw rotor, a casing, and a fluid supply portion to supply fluid in a membrane form into a compression chamber in the casing. The screw rotor has a male and female rotors. A male bore covering the male rotor and a female bore covering the female rotor are formed on the inner surface of the casing. An intersection line, on a higher pressure side, of the male and female bores is defined as a compression cusp. In a bore development view, a trajectory made by the first intersection of an extension line of a female lobe ridge and a male lobe ridge being moved, along with the rotation of the male and female rotors, is defined as a trajectory line. An opening of the fluid supply section to the compression chamber is positioned between the compression cusp and the trajectory line.

16 Claims, 7 Drawing Sheets

(51) Int. Cl.
*G01T 1/02* (2006.01)
*G01T 1/20* (2006.01)

(56) References Cited

U.S. PATENT DOCUMENTS

| | | |
|---|---|---|
| 2008/0083877 A1 | 4/2008 | Nomura et al. |
| 2009/0026375 A1* | 1/2009 | Doshi .................. G01T 1/20 250/366 |
| 2012/0205544 A1 | 8/2012 | Nakatsugawa et al. |
| 2014/0361182 A1 | 12/2014 | Hasegawa et al. |
| 2017/0315241 A1 | 11/2017 | Tadokoro et al. |
| 2018/0011203 A1* | 1/2018 | Katayama ............ G01T 1/167 |
| 2018/0321389 A1* | 11/2018 | Jung .................... G01T 1/023 |
| 2019/0018148 A1 | 1/2019 | Ueno et al. |
| 2019/0204457 A1 | 7/2019 | Tadokoro et al. |

FOREIGN PATENT DOCUMENTS

| | | | |
|---|---|---|---|
| JP | 2013-003120 A | 1/2013 | |
| JP | 2015-017972 A | 1/2015 | |
| JP | 2016-114392 A | 6/2016 | |
| JP | 2017-161378 A | 9/2017 | |
| JP | 2018-036204 A | 3/2018 | |
| JP | 2018-072256 A | 5/2018 | |
| WO | WO-2017081324 A1 * | 5/2017 | ............. G01T 1/023 |
| WO | 2017/158743 A1 | 9/2017 | |
| WO | 2018/016224 A1 | 1/2018 | |

\* cited by examiner

RADIATION MONITOR

TECHNICAL FIELD

The present invention relates to a radiation monitor using one or more optical fibers.

RELATED ART

As radiation monitors for measurements of dose rates of radiation, ionization chambers, Geiger-Muller (GM) counters, scintillation detectors and semiconductor detectors have been used conventionally. In particular, semiconductor detectors are applied to radiation monitors that allow measurements under an environment of low dose rate. Radiation monitors with a semiconductor detector employed therein have found utility, for example, in nuclear power plants and nuclear fuel reprocessing facilities, and also in medical facilities, industrial facilities, research accelerator facilities, general environment monitoring systems and the like, where radioactive isotopes are used. A radiation monitor with a semiconductor detector employed therein uses electron-hole pairs generated by incident radiation, and derives a dose rate from the counting rate of electrical pulses generated by a voltage applied to a semiconductor.

A semiconductor detector, however, entails a risk of explosion if the concentration of hydrogen in air is high, because a high voltage is applied. In addition, electric noise may be transmitted to or received from other measurement instruments, as the semiconductor detector uses electrical pulse signals generated from the semiconductor.

As detectors capable of preventing explosion and suppressing electric noise, there are optical fiber-type radiation detectors (for example, PTL1). An optical fiber-type radiation detector transmits a plurality of photons, which have been generated responsive to incident radiation through an optical fiber, and measures a dose rate based on a counting rate of single photons. Therefore, the optical fiber-type radiation detector does not require energization of a radiation detecting section, and can suppress the reception and transmission of electric noise.

In PTL1, the present inventors proposed to form a light emitting element, which emits light of an intensity corresponding to the dose rate of incident radiation, from a light transmitting material such as, for example, transparent yttrium aluminum garnet (crystals of the garnet structure formed from a compound oxide ($Y_3Al_5O_{12}$) of yttrium and aluminum) as a base material and at least one rare earth element, such as ytterbium (Yb), neodymium (Nd), cerium (Ce) or praseodymium (Pr), incorporated in the light transmitting material.

PRIOR ART LITERATURE

Patent Literature

PTL1: JP-2016-114392-A

SUMMARY OF THE INVENTION

When measuring a dose rate, a radiation monitor is used in an environment of mixed radiation of various energies and in various directions, leading to an outstanding desire for improvements in the accuracy of measurements of dose rates. This desire has stemmed from the fact that a radiation detecting unit has a different measurement sensitivity depending on the energy and radiating direction of incident radiation. In general, it is considered to be useful to flatten the dependence on the energy and radiating direction by use of a metal shield, which can attenuate radiation, or parallel arrangement of a correcting detector section. Such an approach has, however, raised other problems, that is, a reduction in handling ease due to increases in the size and weight of the radiation detecting unit and complication of a system due to the parallel structure configuration. It is hence necessary to flatten the dependence of sensitivity on the energy and radiating direction at a small and single radiation detecting unit.

The present invention therefore has as an object thereof the provision of a radiation monitor that uses an optical fiber and enables to flatten the dependence of sensitivity on the energy and radiating direction.

To achieve the above-described object, there is provided, in an aspect of the present invention, a radiation monitor according to the present invention includes a radiation detecting unit including: a phosphor that emits light responsive to incident radiation; an optical fiber that transmits the light emitted from the phosphor of the radiation detecting unit; a photodetector that converts single photons, the single photons making up the light transmitted from the optical fiber, to electrical pulse signals; a counter that counts the electrical pulse signals converted by the photodetector; a database configured to associate counting rates of electrical pulse signals with dose rates of radiation; and an arithmetic section configured to convert a counting rate of electrical pulse signals, the counting rate having been counted by the counter, to a dose rate of radiation by using the database. The phosphor contains an additive that emits photons when energy is applied. The additive has a concentration gradient.

Other aspects of the present invention will be described in embodiments to be described subsequently herein.

It is to be noted that "counting rate of electrical pulse signals" as used herein means the number of electrical pulse signals measured per unit time. Further, the term "predetermined wavelength range" as used herein means a counting rate range of photons, and represents a range specified in individual standards. Furthermore, the term "wavelengths in a predetermined range" as used herein means a range of transmissive wavelengths so that photons are controlled by allowing only photons of specific wavelengths to transmit. Moreover, the term "single photons" as used herein means individual photons generated in a phosphor by incident radiation. In addition, the term "piled-up electrical pulse signals" as used herein means electrical pulse signals generated when a plurality of single photons is detected at the same time.

According to the present invention, it is possible to flatten the dependence of sensitivity on the energy and irradiating direction in a radiation monitor using an optical fiber.

DESCRIPTION OF THE PREFERRED EMBODIMENTS

About embodiments for carrying out the present invention, a description will be made in detail with reference to the drawings as needed.

First Embodiment

Figure 1:
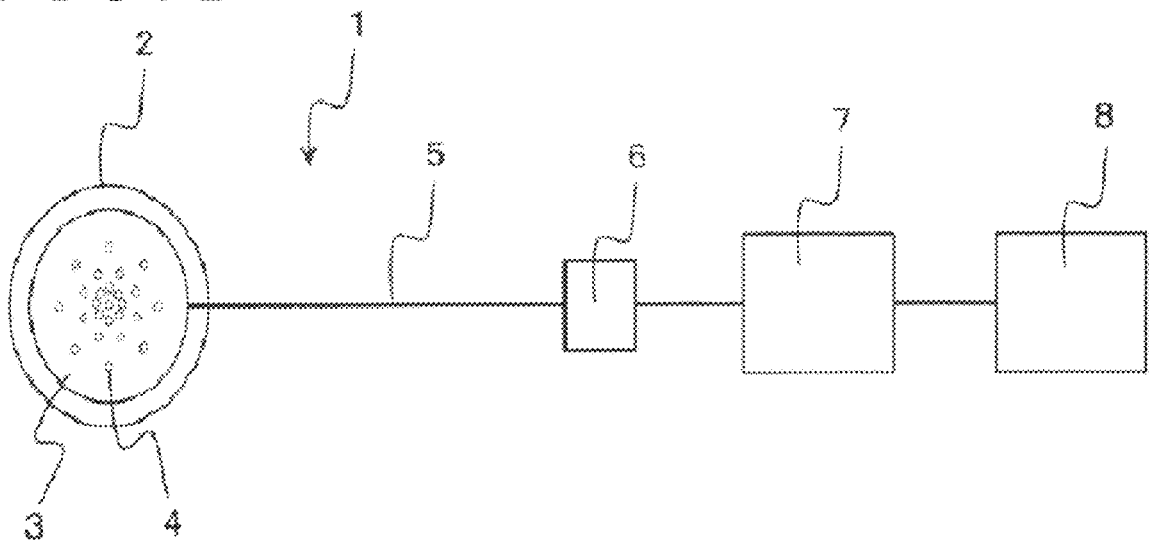
FIG. 1 is a block diagram illustrating a radiation monitor according to a first embodiment.

FIG. 1 is a block diagram illustrating a radiation monitor 1 according to a first embodiment. As illustrated in FIG. 1, the radiation monitor 1 basically includes a radiation detecting unit 2, a phosphor 3, an additive 4, an optical fiber 5, a photodetector 6, a counter 7, and an analysis display unit 8. Examples of radiation which can be measured by the radiation monitor 1 include electromagnetic waves such as X-rays and γ-rays, and particle beams such as α-rays, β-rays, and neutron rays.

The radiation detecting unit 2 is an element including the phosphor 3 that emits light of an intensity corresponding to the dose rate of incident radiation.

The phosphor 3 may desirably be shielded from external light by a housing to distinguish the external light from light emitted from the phosphor 3. The housing is a container that accommodates the phosphor 3. No particular limitation is imposed on the material of the housing insofar as radiation to be measured can transmit through the material. For example, aluminum, stainless steel or the like can be adopted. Described specifically, a light emitting element (for example, the phosphor 3) is accommodated in a housing of the radiation monitor 1 according to the embodiment.

No particular limitation is imposed on the phosphor 3 insofar as it is a composition that shows luminescence. Examples of the luminescence include optically stimulated luminescence by light such as ultraviolet rays, radio-luminescence by radiation, cathode-luminescence by electron beams, electroluminescence by an electric field, chemical luminescence by a chemical reaction, and the like. Specific examples of the phosphor 3 include light transmitting materials formed of base materials such as NaI, CsI, LiI, $SrI_2$, $Bi_4Ge_3O_{12}$, $Bi_4Si_3O_{12}$, $CdWO_4$, $PbWO_4$, ZnS, $CaF_2$, LuAG, LuAP, $Lu_2O_3$, $Y_3Al_5O_{12}$, $YAlO_3$, $Lu_2SiO_5$, LYSO, $Y_2SiO_5$, $Gd_2SiO_5$, $BaF_2$, $CeF_3$, $CeBr_3$, CsF, LiF, $Gd_2O_2S$, $LaBr_3$, $CeBr_3$, $Gd_3Al_2Ga_3O_{12}$, $Cs_2LiYCl_6$, $ScTaO_4$, $LaTaO_4$, $LuTaO_4$, $GdTaO_4$, and $YTaO_4$.

No particular limitation is imposed on a method of producing the phosphor 3 insofar as a composition which shows luminescence can be grown. For example, the floating zone method, the Czochralski method (pulling-up method), the micro-pulling-down method, the Bridgman method, the Verneuil method, or the like can be adopted.

No particular limitation is imposed on the shape of the phosphor 3 insofar as it can be machined. Usable examples include a spherical shape, a hemispherical shape, a cylindrical shape, a prism shape, and the like. The spherical shape is superior in that omnidirectional measurement of radiation as a target of measurement is feasible. The hemispherical shape is superior in that forward measurement of radiation as a target of measurement is feasible. The cylindrical shape is superior in that growth and machining of the phosphor is easy. The prism shape is superior in that machining is easy.

The additive 4 acts to release photons upon application of energy, and no particular limitation is imposed thereon insofar as it can be incorporated in the phosphor 3. Examples include rare earth elements such as La, Ce, Pr, Nd, Sm, Eu, Gd, Tb, Dy, Ho, Er, Tm, Yb, Lu and Y, elements such as Tl, Na, Ag, W and $CO_3$, and particulate fluorescent materials. Further, element ions of the additive 4 are not limited to any particular valence state insofar as they can be used for the emission of light. Usable examples include monovalent element ions, divalent element ions, trivalent element ions, tetravalent element ions, and so on.

No particular limitation is imposed on the concentration gradient of the additive 4 insofar as the additive 4 can be incorporated in the phosphor 3. Usable examples include a concentration gradient that the additive 4 concentrically spreads outwards from a central portion of the phosphor 3, a concentration gradient that the additive 4 spreads in radial and axial direction of the phosphor 3 from a point of connection between the phosphor 3 and the optical fiber 5, and the like. Further usable examples include a concentration gradient that the concentration of the additive decreases outwards from the central portion, and a concentration gradient that the concentration of the additive increases outwards from the central portion.

The optical fiber 5 is connected to the phosphor 3, and transmits light emitted from the phosphor 3. The optical fiber 5 connects the phosphor 3 to the photodetector 6 to be described subsequently herein. Examples of the material that forms the optical fiber 5 include quartz, plastics, and the like.

The photodetector 6 is connected to the optical fiber 5, and converts photons, which have been transmitted from the optical fiber 5, to electrical pulse signals. The photodetector 6 is interposed between the optical fiber 5 and the counter 7 to be described subsequently herein. As the photodetector 6, a photomultiplier tube, an avalanche photodiode, or the like can be adopted, for example. The use of the photomultiplier tube or the like enables to detect each single photon as a current-amplified, single electrical pulse signal.

The counter 7 is a device, which is connected to the photodetector 6 and counts electrical pulse signals inputted from the photodetector 6. The counter 7 is interposed between the photodetector 6 and the analysis display unit 8 to be described subsequently herein. As the counter 7, a digital signal processor or the like can be adopted, for example.

The analysis display unit 8 is connected to the counter 7, converts the counting rate of the electrical pulse signals, which have been counted by the counter 7, to a radiation dose rate, and displays the value of the radiation dose rate. The analysis display unit 8 includes a storage section retaining a database configured to associate counting rates of electrical pulse signals with dose rates of radiation, an arithmetic section configured to convert the counting rate of electrical pulse signals to a dose rate of radiation by using the database, and a display section that displays the converted dose rates of radiation. As the analysis display unit 8, a personal computer having the above-mentioned functions, or the like can be adopted, for example.

Different from the conventional method of converting the counting rate of γ-rays to a dose rate of radiation, the counting rate of single photons, which are included in a plurality of photons generated at the phosphor 3 by incident γ-rays, is converted to a dose rate of radiation in the present invention.

Figure 2:
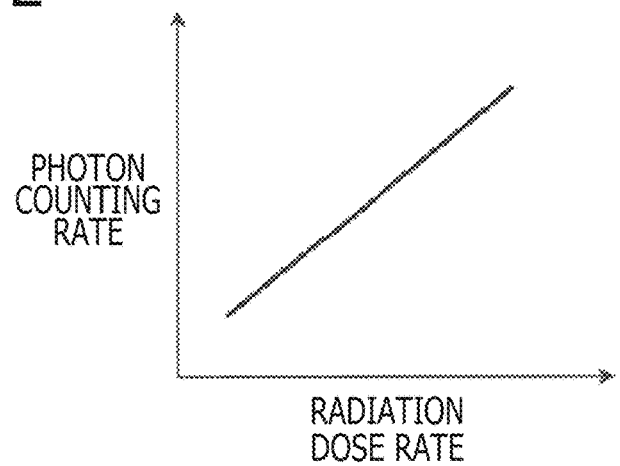
FIG. 2 is a schematic diagram illustrating an example about a relationship between the dose rate of radiation and the counting rate of single photons.

FIG. 2 is a schematic diagram illustrating an example about a relationship between the dose rate of radiation and the counting rate of single photons. As appreciated from FIG. 2, the counting rate of radiation can be acquired if the counting rate of single photons can be measured. Use of the relationship can therefore convert the counting rate of single photons, which has been calculated using the relationship, to a dose rate of radiation.

Next, a description will be made about operation of the radiation monitor 1.

Figure 3:
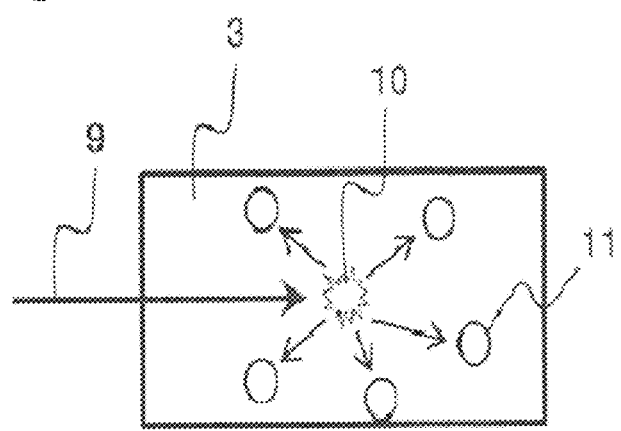
FIG. 3 is a schematic diagram illustrating an example about the generation of light when radiation enters a phosphor.

FIG. 3 is a schematic diagram illustrating an example about the generation of light when radiation 9 enters the phosphor 3. In FIG. 3, an interaction 10 occurs when the radiation 9 enters the phosphor 3. Accompanying with the interaction 10, a plurality of single photons 11 is generated.

Figure 4:
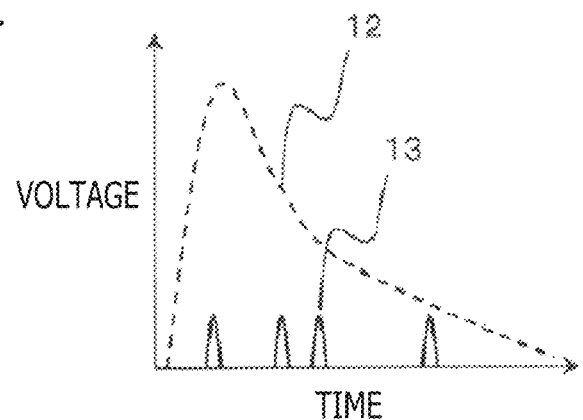
FIG. 4 is a schematic diagram illustrating an example of electrical pulse signals when an output of a photodetector is assumed to have been measured.

FIG. 4 is a schematic diagram illustrating an example of electrical pulse signals 13 when an output of the photodetector 6 is assumed to have been measured. In general, when a single beam of radiation 9 enters the phosphor 3, a plurality of single photons 11 are generated. Using the photodetector 6, the single photons 11 are measured as a single electrical pulse signal 12. In the present embodiment, on the other hand, the single photons 11 transmitted from the optical fiber 5 are measured one after another by the photodetector 6. As illustrated in FIG. 4, the single photons 11 are measured as electrical pulse signals 13 with a time width of about 2 ns by the photodetector 6.

Figure 5:
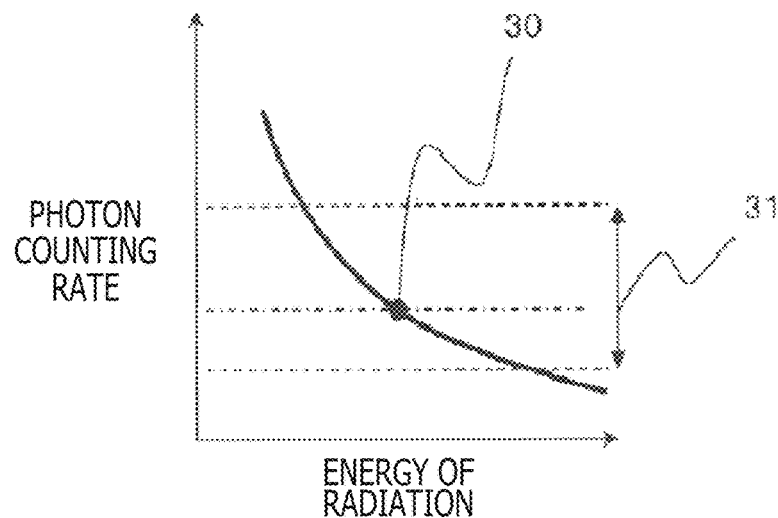
FIG. 5 is a schematic diagram illustrating an example about the dependence of the counting rate of photons on energy.

FIG. 5 is a schematic diagram illustrating an example about the dependence of the counting rate of photons on energy. As illustrated in FIG. 5, the counting rate 30 of photons detected by the photodetector 6 changes depending on the energy of incident radiation. In general, as the energy of radiation decreases, the counting rate 30 of photons increases, and as the energy of radiation increases, the counting rate 30 of photons decreases. This is attributed to the fact that the phosphor 3 has a different measurement sensitivity depending on the energy of incident radiation. Especially, if a phosphor 3 of high density is applied to the radiation detecting unit 2, this tendency becomes conspicuous. When measuring a dose rate, a radiation monitor is used in an environment of mixed radiation of various energies and in various directions. There is accordingly a need to flatten the sensitivity of the phosphor 3 so that the measured counting rate of photons falls within a predetermined standard range 31 for various radiation energies.

Figure 6:
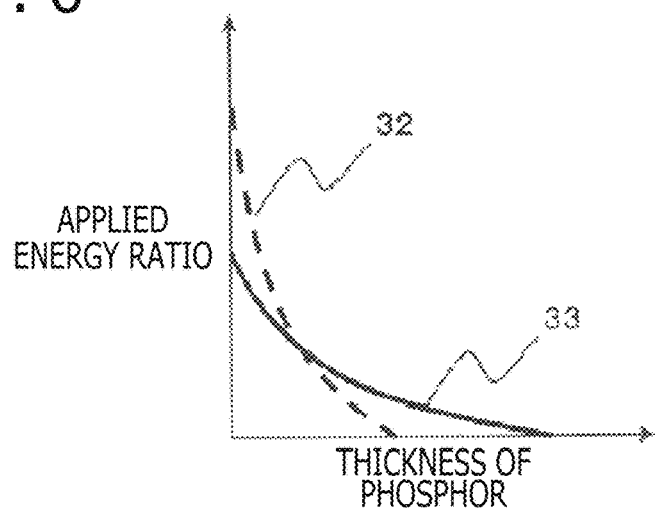
FIG. 6 is a schematic diagram illustrating an example about the dependence of the low/high ratio of applied energy on the thickness of the phosphor.

FIG. 6 is a schematic diagram illustrating an example about the dependence of the low/high ratio of applied energy on the thickness of the phosphor. As illustrated in FIG. 6, low energy radiation 32 has low penetration power, and thus the energy is mainly applied to a surface of the phosphor 3 in the plane of incidence of radiation. On the other hand, high energy radiation 33 has high penetration power, and thus the energy is applied to a depth in the thickness direction of the phosphor 3 in comparison with the low energy radiation 32.

Figure 7:
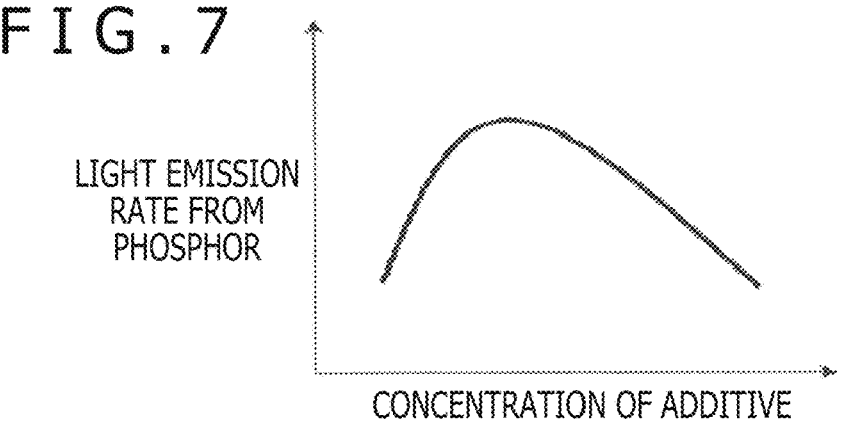
FIG. 7 is a schematic diagram illustrating an example about the dependence of the generation rate of light from the phosphor on the concentration of an additive.

FIG. 7 is a schematic diagram illustrating an example about the dependence of the generation rate of light from the phosphor on the concentration of an additive. As illustrated in FIG. 7, the generation rate of light from the phosphor generally increases with the concentration of the additive, and then takes a downward turn at an optimal concentration of the additive, because the probability of transition of excited electrons to the ground state of an adjacent additive of the same species increases with the concentration of the additive. As a consequence, the excited electrons relax into thermal energy, and therefore the intensity of light emitted from the phosphor 3 decreases.

Figure 8:
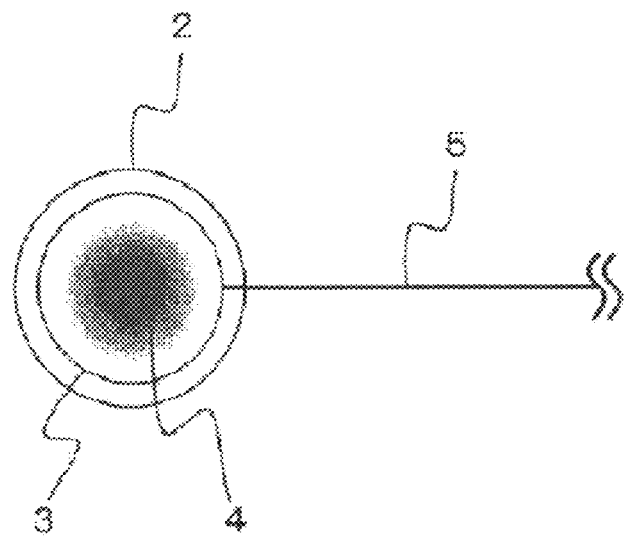
FIG. 8 is a schematic diagram illustrating an example about a concentration gradient of the additive incorporated in the phosphor.

FIG. 8 is a schematic diagram illustrating an example about a concentration gradient of the additive incorporated in the phosphor. As illustrated in FIG. 8, the additive 4 has a concentration gradient that the additive concentration decreases outwards from the central portion of the phosphor 3. By setting the additive concentration in the central portion of the phosphor 3 at an additive concentration capable of showing a high emission rate of light from the phosphor so that the emission rate of light is relatively decreased toward an outer side of the phosphor 3, it is possible to flatten the dependence of sensitivity on energy and irradiating direction in a radiation monitor using an optical fiber.

A phosphor with an additive incorporated at a uniform concentration therein (a phosphor of conventional art) involves a problem that the sensitivity to low energy radiation is high and the sensitivity to high energy radiation is low. To resolve the problem (to flatten the sensitivity), specifically to permit flattening the energy dependence of the sensitivity, the emission rate of light is decreased (the sensitivity is decreased) in a surface layer of the phosphor where low energy radiation is detected, while the emission rate of light is increased (the sensitivity is increased) in an inner portion of the phosphor where high energy radiation is detected.

Figure 9:
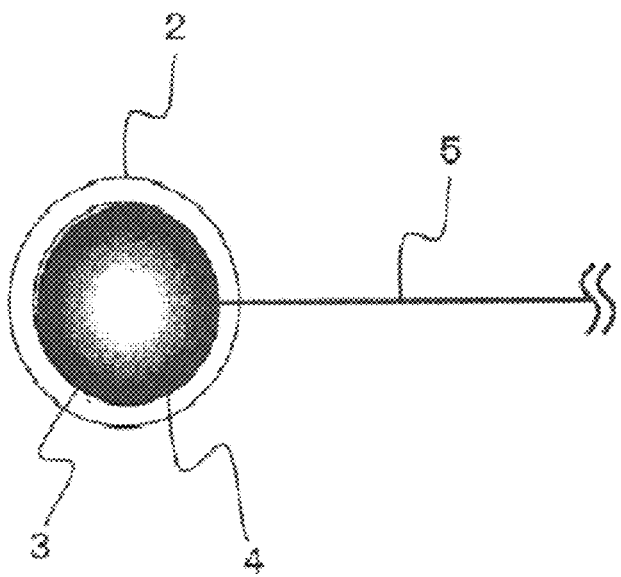
FIG. 9 is a schematic diagram illustrating an example about an opposite concentration gradient of the additive incorporated in the phosphor.

FIG. 9 is a schematic diagram illustrating an example about an opposite concentration gradient of the additive incorporated in the phosphor. As illustrated in FIG. 9, the additive 4 has a concentration gradient that the additive concentration increases outwards from the central portion of the phosphor 3. By setting the additive concentration in the central portion of the phosphor 3 at an additive concentration capable of showing a high emission rate of light from the phosphor so that the emission rate of light is relatively decreased toward the outer side of the phosphor 3, it is possible to flatten the dependence of sensitivity on energy and irradiating direction in the radiation monitor using the optical fiber.

As described above, owing to the possession by the additive 4 of a concentration gradient from the central portion of the phosphor 3 toward the outside of the phosphor 3, the radiation monitor 1 can flatten the sensitivity to radiation of various energies and in various directions, and hence can make improvements in the accuracy of measurements of dose rates.

Next, a description will be made about preferred use examples of the radiation monitor 1.

Figure 10:
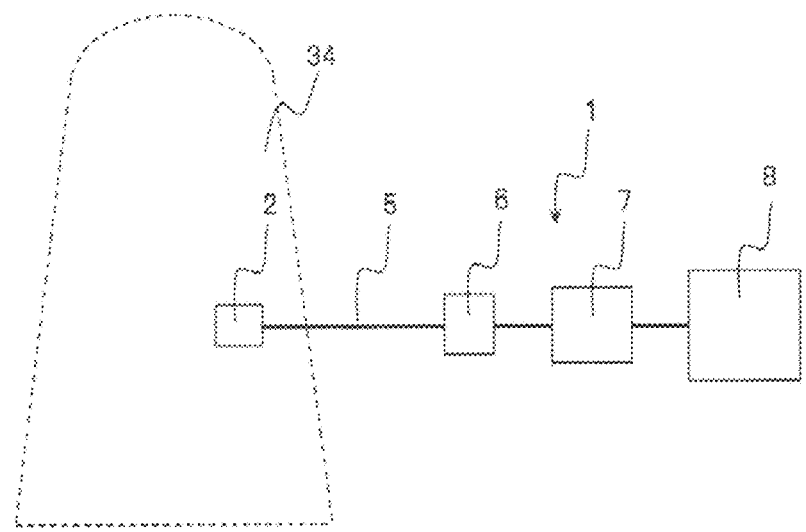
FIG. 10 is a schematic diagram illustrating a use example of the radiation monitor of FIG. 1.

FIG. 10 is a schematic diagram illustrating a use example of the radiation monitor 1 of FIG. 1. As illustrated in FIG. 10, the radiation detecting unit 2 is installed in a measurement target area 34, while the photodetector 6, the counter 7 and the analysis display unit 8, which are directly or indirectly connected to the optical fiber 5, are installed outside the measurement target area 34. Therefore, the radiation monitor 1 can measure the dose rates of radiation of various energies and in various directions with high accuracy, for example, inside a nuclear reactor building or a nuclear reactor containment vessel.

Figure 11:
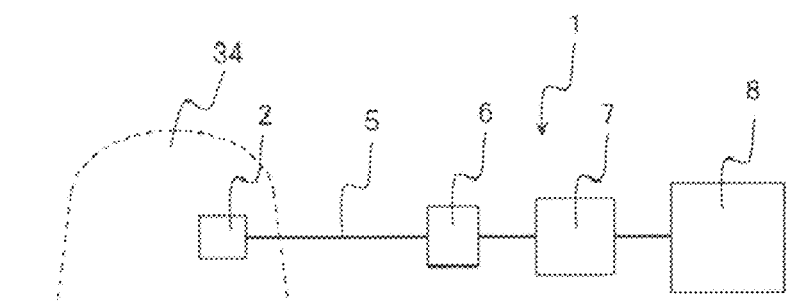
FIG. 11 is a schematic diagram illustrating another use example of the radiation monitor of FIG. 1.

FIG. 11 is a schematic diagram illustrating another use example of the radiation monitor 1 of FIG. 1. As illustrated in FIG. 11, the dose rate distribution in the measurement target area 34 can be measured with high accuracy by installing at least two radiation detecting units 2 in the measurement target area 34. The radiation monitor 1 can therefore be applied to a nuclear power plant or nuclear fuel reprocessing facility, or a medical facility, industrial facility, research accelerator facility, general environment monitoring system or the like, where radioactive isotopes are used.

Second Embodiment

A radiation monitor 1 according to a second embodiment of the present invention will be described with reference to FIG. 12. In the following embodiment as an alternative for the first embodiment, like components are identified by like reference numerals, and only different components will be described. Therefore, the components the description of which will be omitted herein are similar to the corresponding components in the first embodiment.

Figure 12:
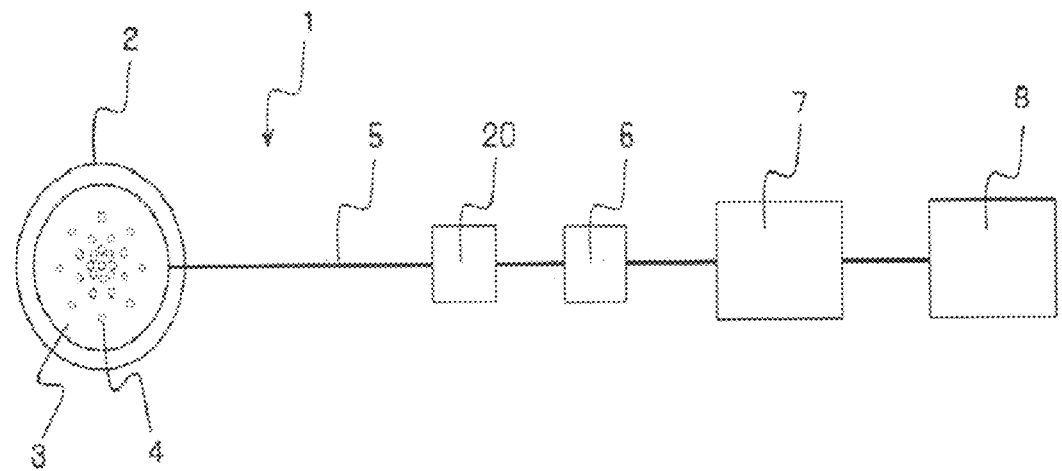
FIG. 12 is a schematic block diagram illustrating a radiation monitor according to a second embodiment.

FIG. 12 is a schematic block diagram illustrating the radiation monitor 1 according to the second embodiment. The schematic block diagram illustrating the second embodiment is different in that an optical filter 20 is included. It is to be noted that the radiation detecting unit 2, phosphor 3, additive 4, optical fiber 5, photodetector 6, counter 7 and analysis display unit 8 are similar to the corresponding ones in the first embodiment and their detailed description will be omitted herein accordingly.

The optical filter 20 is a device, which is interposed between the optical fiber 5 and the photodetector 6, and attenuates the number of photons transmitted from the optical fiber 5 or allows a predetermined range of wavelengths to pass. As appreciated from the foregoing, the radiation monitor 1 according to the second embodiment has a function to attenuate the number of photons through the optical filter 20, and therefore can reduce a pile-up of single photons and can increase a dynamic range of measurement. In addition, the radiation monitor 1 according to the second embodiment also has a function to allow the predetermined range of wavelengths to pass through the optical filter 20, and therefore can exclude emission wavelengths other than those of light emitted from the additive in the phosphor 3 and can make improvements in the measurement accuracy of dose rate. As the optical filter 20, a wavelength filter, an attenuating filter, or the like can be adopted, for example. The wavelength filter allows passage of only photons in a predetermined wavelength range. The attenuating filter can attenuate the number of photons of light at a predetermined probability. Two or more optical filters can also be used in combination.

The radiation monitor 1 according to the second embodiment includes the radiation detecting unit 2 having the phosphor 3 that emits photons responsive to incident radiation, the optical fiber 5 that transmits the photons emitted from the radiation detecting unit 2, the photodetector 6 that converts single photons, which have been transmitted from the optical fiber 5, to electrical pulse signals 13, the counter 7 that counts the electrical pulse signals 13, and the analysis display unit 8 that determines the dose rate of radiation based on a counting rate of the electrical pulse signals 13 from a relationship between the dose rate of radiation and the counting rate of single photons, and is characterized in that the phosphor 3 contains the additive 4 that emits photons when energy is applied, the additive 4 has a concentration gradient from the central portion of the phosphor 3 toward the outside of the phosphor 3, and the radiation monitor 1 includes the optical filter 20 that attenuates the single photons transmitted from the optical fiber 5.

According to the present embodiment, the radiation monitor 1 has a function to attenuate the number of photons through the optical filter 20, and therefore can reduce a pile-up of single photons and can increase a dynamic range of measurement. In addition, the radiation monitor 1 according to the second embodiment also has a function to allow the predetermined range of wavelengths to pass through the optical filter 20, and therefore can exclude emission wavelengths other than those of light emitted from the additive in the phosphor 3 and can make improvements in the measurement accuracy of dose rate.

Third Embodiment

A radiation monitor 1 according to a third embodiment of the present invention will be described with reference to FIG. 13. In the following embodiment as an alternative for the first or second embodiment, like components are identified by like reference numerals, and only different components will be described. Therefore, the components the description of which will be omitted herein are similar to the corresponding components in the first or second embodiment.

Figure 13:
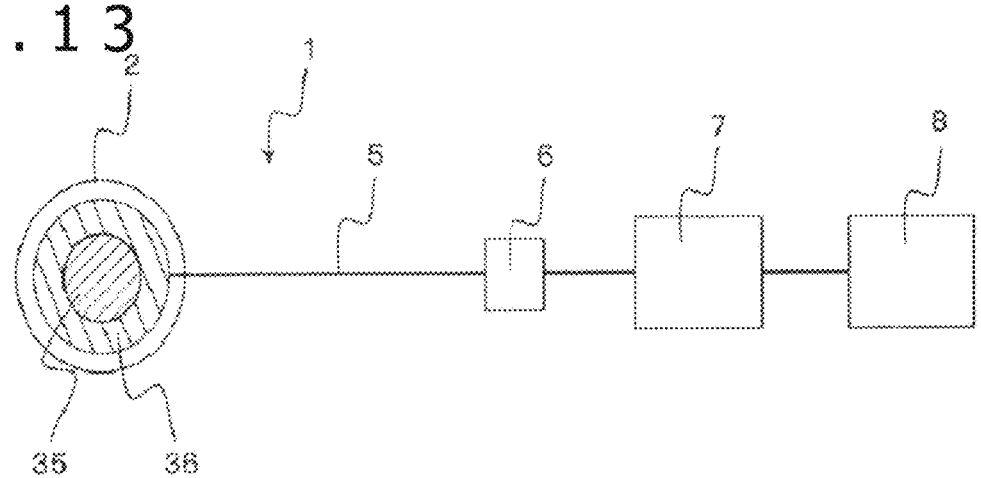
FIG. 13 is a schematic block diagram illustrating a radiation monitor according to a third embodiment.

FIG. 13 is a schematic block diagram illustrating the radiation monitor 1 according to the third embodiment. The schematic block diagram illustrating the third embodiment is different in that a first phosphor 35 and a second phosphor 36 are included. It is to be noted that the radiation detecting unit 2, optical fiber 5, photodetector 6, counter 7 and analysis display unit 8 are similar to the corresponding ones in the first embodiment and their detailed description will be omitted herein accordingly.

The first phosphor 35 and the second phosphor 36 form a multilayer structure so that the first phosphor 35 is radially surrounded by the second phosphor 36. No particular limitation is imposed on the total number of kinds of phosphors insofar as a multilayer structure is formed, and three or more kinds of phosphors may also be stacked one over another.

No particular limitation is imposed on the additive 4 to be added to the first phosphor 35 and the second phosphor 36 insofar as a multilayer structure is formed. The additive 4 may be changed in element species, concentration gradient, density distribution and/or the like.

In the radiation monitor 1 according to the present embodiment, the first phosphor 35 and the second phosphor 36 may preferably form a nested multilayer structure. The nested multilayer structure can facilitate fabrication of the radiation detecting unit 2. Further, the nested multilayer structure can also flatten the sensitivity of the phosphor 3 to radiation of various energies and in various directions, and hence can make improvements in the accuracy of measurements of dose rates.

Fourth Embodiment

A radiation monitor 1 according to a fourth embodiment of the present invention will be described with reference to FIG. 14. In the following embodiment as an alternative for any one of the first to third embodiments, like components are identified by like reference numerals, and only different components will be described. Therefore, the components the description of which will be omitted herein are similar to the corresponding components in the same one of the first to third embodiments.

Figure 14:
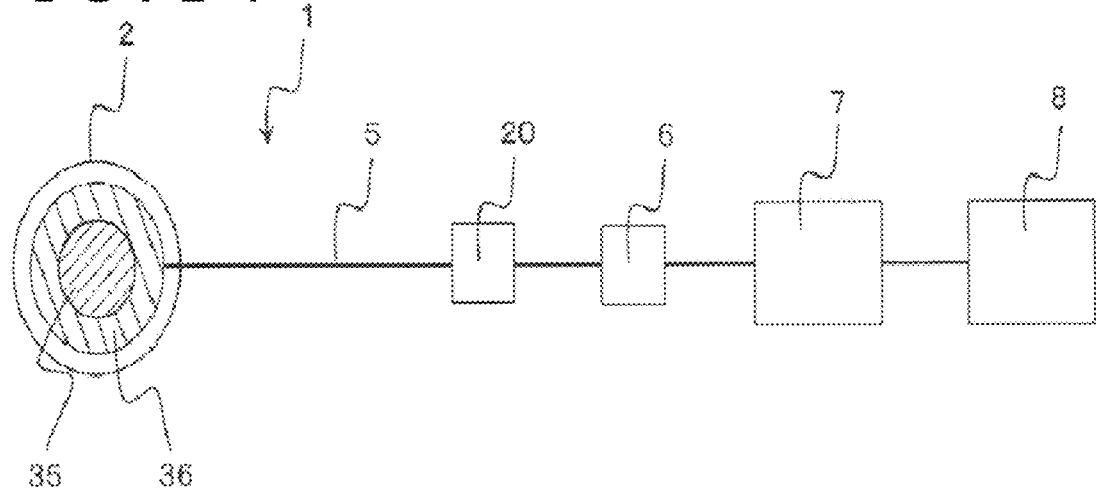
FIG. 14 is a schematic block diagram illustrating a radiation monitor according to a fourth embodiment.

FIG. 14 is a schematic block diagram illustrating the radiation monitor 1 according to the fourth embodiment. The schematic block diagram illustrating the fourth embodiment is different in that the radiation monitor 1 further includes the optical filter 20. It is to be noted that the radiation detecting unit 2, first phosphor 35, second phosphor 36, optical fiber 5, photodetector 6, counter 7 and analysis display unit 8 are similar to the corresponding ones in the same one of the first to third embodiments and their detailed description will be omitted herein accordingly.

The optical filter 20 is a device, which is interposed between the optical fiber 5 and the photodetector 6, and attenuates the number of photons transmitted from the optical fiber 5 or allows a predetermined range of wavelengths to pass. As appreciated from the foregoing, the radiation monitor 1 according to the fourth embodiment has a function to attenuate the number of photons through the optical filter 20, and therefore can reduce a pile-up of single photons and can increase a dynamic range of measurement. In addition, the radiation monitor 1 according to the fourth embodiment also has a function to allow the predetermined range of wavelengths to pass through the optical filter 20, and therefore can exclude emission wavelengths other than those of light emitted from the additive in the first and second phosphors 35 and 36 and can make improvements in the measurement accuracy of dose rate. As the optical filter 20, a wavelength filter, an attenuating filter, or the like can be adopted, for example. The wavelength filter allows passage of only photons of wavelengths in a predetermined range. The attenuating filter can attenuate the number of photons of light at a predetermined probability. Two or more optical filters can also be used in combination.

According to the present embodiment, the radiation monitor 1 has a function to attenuate the number of photons through the optical filter 20, and therefore can reduce a pile-up of single photons and can increase a dynamic range of measurement. In addition, the radiation monitor 1 also has a function to allow the predetermined range of wavelengths to pass through the optical filter 20, and therefore can exclude emission wavelengths other than those of light emitted from the additive in the first and second phosphors 35 and 36 and can make improvements in the measurement accuracy of dose rate.

Fifth Embodiment

A radiation monitor 1 according to a fifth embodiment of the present invention will be described with reference to FIG. 15. In the following embodiment as an alternative for any one of the first to fourth embodiments, like components are identified by like reference numerals, and only different components will be described. Therefore, the components the description of which will be omitted herein are similar to the corresponding ones in the same one of the first to fourth embodiments.

Figure 15:
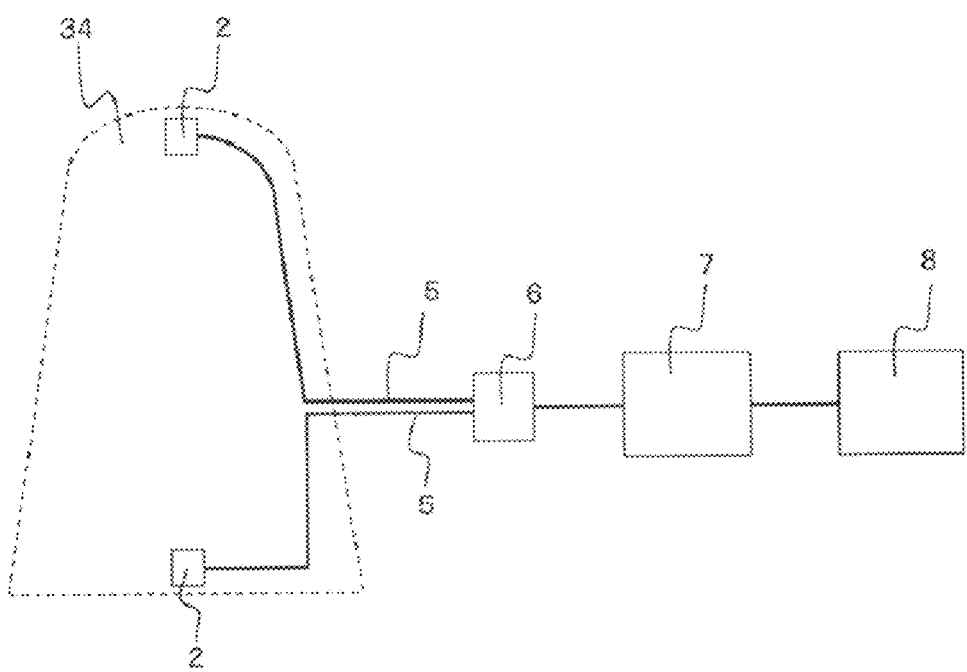
FIG. 15 is a schematic block diagram illustrating a radiation monitor according to a fifth embodiment.

FIG. 15 is a schematic block diagram illustrating the radiation monitor 1 according to the fifth embodiment. The schematic block diagram illustrating the fifth embodiment is different in that at least two radiation detecting units 2 are included and at least two optical fibers 5 are connected to the same photodetector 6. It is to be noted that the radiation detecting unit 2, optical fibers 5, counter 7, analysis display unit 8 and measurement target area 34 are similar to the corresponding ones in the first embodiment and their detailed description will be omitted herein accordingly.

In the radiation monitor 1 according to the present embodiment, the photodetector 6, the counter 7 and the analysis display unit 8 are used in common for the two radiation detecting units 2 and the two optical fibers 5, so that the number of components is reduced. As a consequence, saving of installation space through downsizing of the radiation monitor 1, a reduction of introduction and running costs, decreases of the numbers of inspection items and steps upon maintenance and a reduction of variations in the accuracy of radiation dose measurement by effects of individual differences of the photodetector 6 are realized.

As the photodetector 6, a position detection type photomultiplier tube, an avalanche photodiode, or the like can be adopted, for example. By doing so, it is possible to distinguish and measure individual dose rates at two or more radiation detecting units from information about the detection positions of photons in the photodetector 6.

Sixth Embodiment

A radiation monitor 1 according to a sixth embodiment of the present invention will be described with reference to FIG. 16. In the following embodiment as an alternative for the fifth embodiment, like components are identified by like reference numerals, and only a different component will be described. Therefore, the components the description of which will be omitted herein are similar to the corresponding ones in the fifth embodiments.

Figure 16:
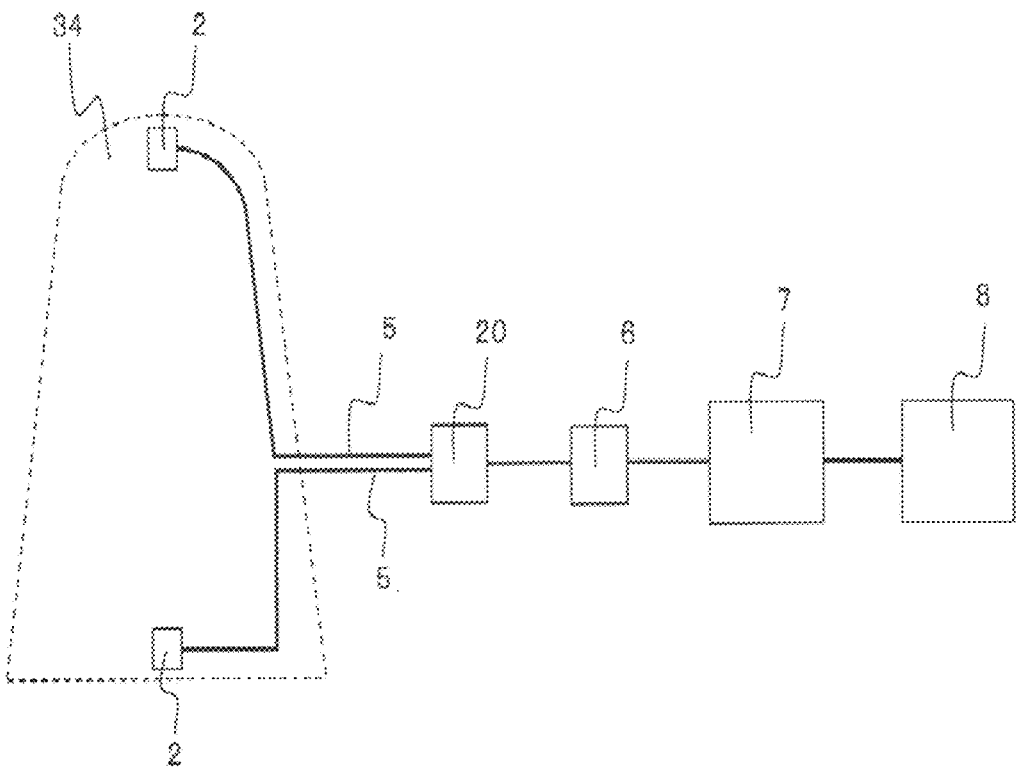
FIG. 16 is a schematic block diagram illustrating a radiation monitor according to a sixth embodiment.

FIG. 16 is a schematic block diagram illustrating the radiation monitor 1 according to the sixth embodiment. The schematic block diagram illustrating the sixth embodiment is different in that the optical filter 20 is further included. It is to be noted that the radiation detecting units 2, optical fibers 5, photodetector 6, counter 7, analysis display unit 8 and measurement target area 34 are similar to the corresponding ones in the fifth embodiment and their detailed description will be omitted herein accordingly.

The two optical fibers 5 are connected to the same optical filter 20, and the optical filter 20 is a device that with respect to photons transmitted from each optical fiber 5, attenuates the number of photons or allows a predetermined range of wavelengths to pass.

According to the present embodiment, the radiation monitor 1 has a function to attenuates the number of photons through the optical filter 20, and therefore can reduce a pile-up of single photons and can increase a dynamic range of measurement. In addition, the radiation monitor 1 according to the sixth embodiment also has a function to allow the predetermined range of wavelengths to pass through the optical filter 20, and therefore can exclude emission wavelengths other than those of light emitted from the additive in the phosphor 3 and can make improvements in the measurement accuracy of dose rate.

Seventh Embodiment

A radiation monitor 1 according to a seventh embodiment of the present invention will be described with reference to FIG. 17. In the following embodiment as an alternative for the fifth embodiment, like components are identified by like reference numerals, and only different components will be described. Therefore, the components the description of which will be omitted herein are similar to the corresponding ones in the fifth embodiment.

Figure 17:
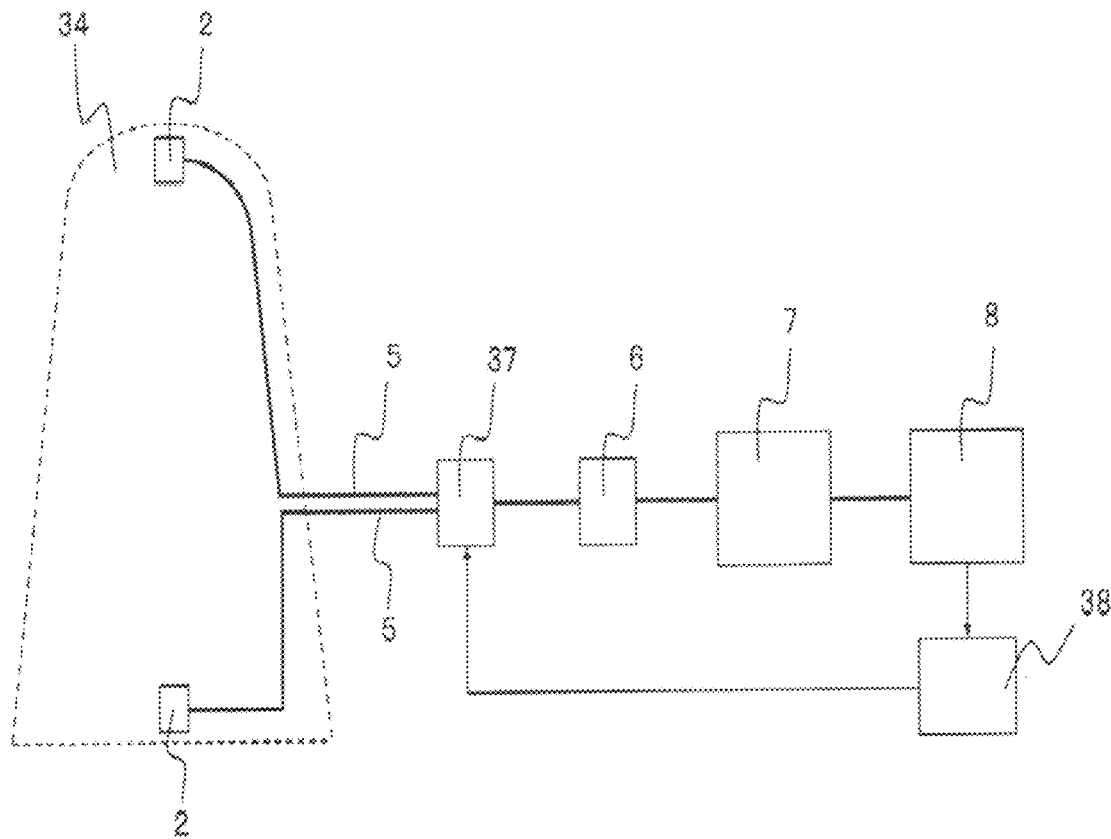
FIG. 17 is a schematic block diagram illustrating a radiation monitor according to a seventh embodiment.

FIG. 17 is a schematic block diagram illustrating the radiation monitor 1 according to the seventh embodiment. The schematic block diagram illustrating the seventh embodiment is different in that a light selecting device 37 and a control section 38 are further included. The light selecting device 37 selects photons transmitted from the optical fibers 5, and the control section 38 is disposed between the analysis display unit 8 and the light selecting device 37, and is configured to control the light selecting device 37. It is to be noted that the radiation detecting units 2, optical fibers 5, photodetector 6, counter 7, analysis display unit 8 and measurement target area 34 are similar to the corresponding ones in the fifth embodiment and their detailed description will be omitted herein accordingly.

The light selecting device 37 is a mechanism, which is operated by an output from the control section 38 and is configured to select one of the optical fibers 5, the one optical fiber 5 being connected to the light selecting device 37. No particular limitation is imposed on the light selecting device 37 insofar as a desired one of the optical fibers 5 can be selected. For example, an optical switch, an optical coupler, an optical splitter, or the like can be adopted. The light selecting device 37 may also be configured to select a desired one of three or more optical fibers.

The control section 38 is a device, which is connected to the analysis display unit 8 and the light selecting device 37 described above, determines whether or not measurement by the analysis display unit 8 ends, and controls the light selecting device 37 according to a determination result. When the measurement by the analysis display unit 8 ends, the control section 38 drives the light selection device 37 to select the one optical fiber 5. It should be noted that it is also possible to select three or more photon sending units 6.

In the radiation monitor 1 according to the present embodiment, the photodetector 6, the counter 7 and the analysis display unit 8 are used in common for the two radiation detecting units 2 and the two optical fibers 5, so that the number of components is reduced. As a consequence, saving of installation space through downsizing of the radiation monitor 1, a reduction of introduction and running costs, decreases of the numbers of inspection items and steps upon maintenance and a reduction of variations in the accuracy of radiation dose measurement by effects of individual differences of the photodetector 6 are realized. In addition, the radiation monitor 1 according to the present embodiment can automate all measurements at the two radiation detecting units 2, thereby substantially reducing the labor and time required for measurement. Three of more radiation detecting units 2 may also be arranged in combination with a like number of optical fibers 5.

Eighth Embodiment

A radiation monitor 1 according to an eighth embodiment of the present invention will be described with reference to FIG. 18. In the following embodiment as an alternative for the seventh embodiment, like components are identified by like reference numerals, and only a different component will be described. Therefore, the components the description of which will be omitted herein are similar to the corresponding ones in the seventh embodiment.

Figure 18:
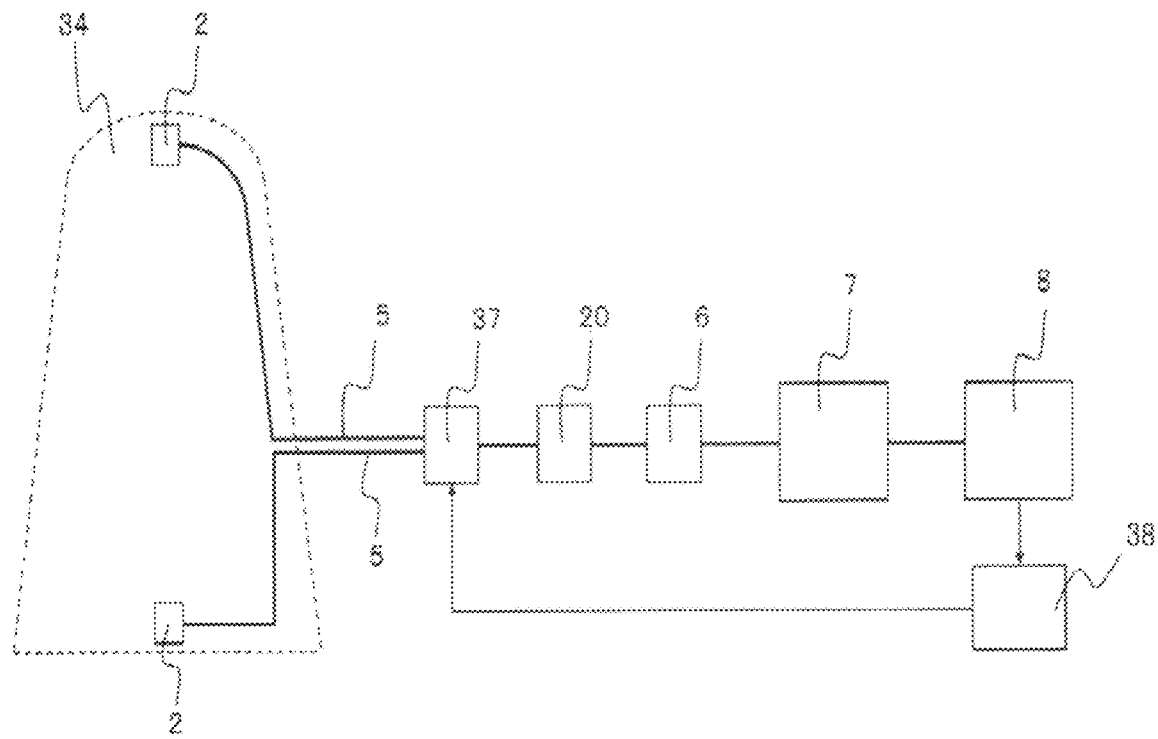
FIG. 18 is a schematic block diagram illustrating a radiation monitor according to an eighth embodiment.

FIG. 18 is a schematic block diagram illustrating the radiation monitor 1 according to the eighth embodiment. The schematic block diagram illustrating the eighth embodiment is different in that the radiation monitor 1 further includes the optical filter 20. It is to be noted that the radiation detecting units 2, optical fibers 5, photodetector 6, counter 7, analysis display unit 8, light selecting device 37, control section 38, and measurement target area 34 are similar to the corresponding ones in the seventh embodiment and their detailed description will be omitted herein accordingly.

The optical filter 20 is a device, which is connected to the light selecting device 37, and with respect to photons transmitted from the light selecting device 37, attenuates the number of photons or allows a predetermined range of wavelengths to pass.

According to the present embodiment, the radiation monitor 1 has a function to attenuate the number of photons through the optical filter 20, and therefore can reduce a pile-up of single photons and can increase a dynamic range of measurement. In addition, the radiation monitor 1 also has a function to allow the predetermined range of wavelengths to pass through the optical filter 20, and therefore can exclude emission wavelengths other than those of light emitted from the additive in the phosphors 3 and can make improvements in the measurement accuracy of dose rate.

Ninth Embodiment

A radiation monitor 1 according to a ninth embodiment of the present invention will be described with reference to FIG. 19. In the following embodiment as an alternative for the seventh embodiment, like components are identified by like reference numerals, and only different components will be described. Therefore, the components the description of which will be omitted herein are similar to the corresponding ones in the seventh embodiment.

Figure 19:
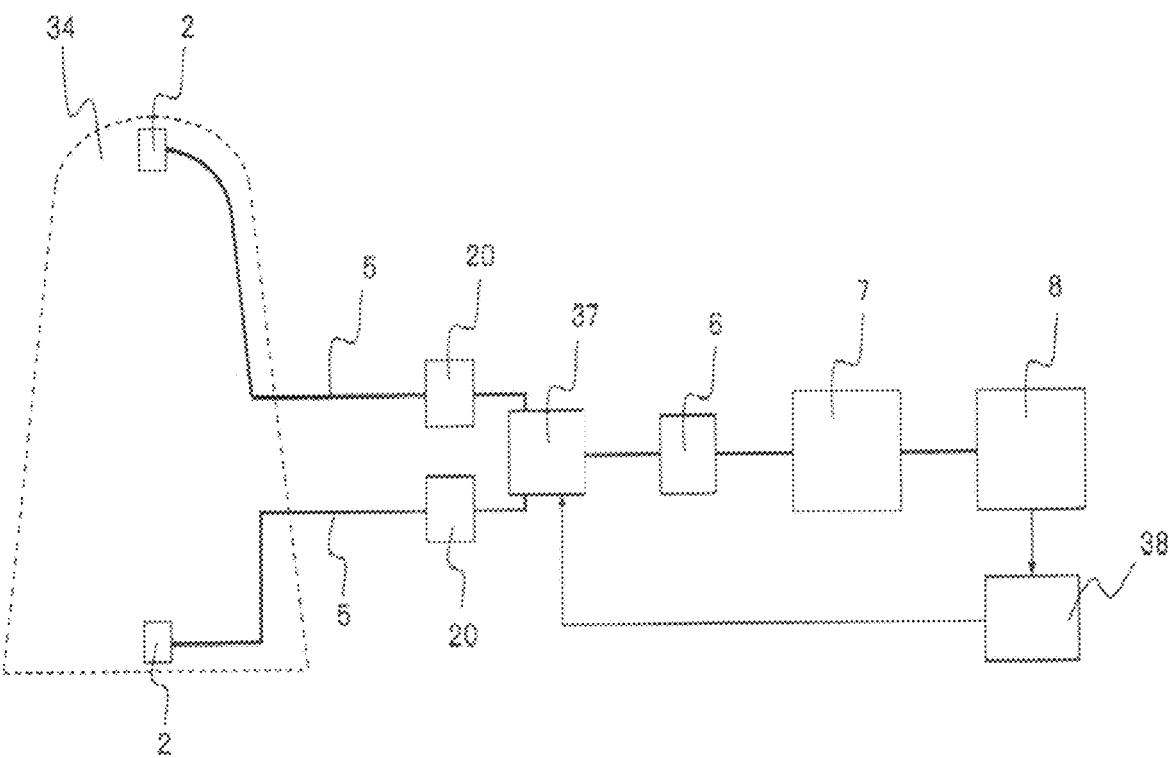
FIG. 19 is a schematic block diagram illustrating a radiation monitor according to a ninth embodiment.

FIG. 19 is a schematic block diagram illustrating the radiation monitor 1 according to the ninth embodiment. The schematic block diagram illustrating the ninth embodiment is different in that the radiation monitor 1 includes two optical filters 20, one being interposed between one of the optical fibers 5 and the light selecting device 37, and the other between the other optical fiber 5 and the light selecting device 37. It is to be noted that the radiation detecting units 2, optical fibers 5, photodetector 6, counter 7, analysis display unit 8, light selecting device 37, control section 38, and measurement target area 34 are similar to the corresponding ones in the seventh embodiment and their detailed description will be omitted herein accordingly.

The optical filters 20 are devices, which are each interposed between the corresponding one of the optical fibers 5 and the light selecting device 37, and with respect to photons transmitted from the corresponding optical fiber 5, attenuates the number of photons or allows a predetermined range of wavelengths to pass. For photons transmitted from each radiation detecting unit 2, the corresponding optical filter 20 can be selected owing to the above-described configuration of the radiation monitor 1 according to the ninth embodiment.

In the radiation monitor 1 according to the present embodiment, the photodetector 6, the counter 7 and the analysis display unit 8 are used in common for the two radiation detecting units 2 and the two optical fibers 5, so that the number of components is reduced. As a consequence, saving of installation space through downsizing of the radiation monitor 1, a reduction of introduction and running costs, decreases of the numbers of inspection items and steps upon maintenance and a reduction of variations in the accuracy of radiation dose measurement by effects of individual differences of the photodetector 6 are realized.

In addition, the radiation monitor 1 according to the present embodiment can automate all measurements at the two radiation detecting units 2, thereby substantially reducing the labor and time required for measurement. Three of more radiation detecting units 2 may also be arranged in combination with a like number of optical fibers 5. Owing to the connection of the two optical filters 20 to the corresponding individual optical fibers 5, an optimal one of the radiation detecting units 2 can be applied depending on the environment of each of a plurality of different measurement targets.

What is claimed is:

1. A radiation monitor comprising:
    a radiation detecting unit including a phosphor that emits light responsive to incident radiation;
    an optical fiber that transmits the light emitted from the phosphor of the radiation detecting unit;
    a photodetector that converts single photons, the single photons making up the light transmitted from the optical fiber, to electrical pulse signals;
    a counter that counts the electrical pulse signals converted by the photodetector;
    a database configured to associate counting rates of electrical pulse signals with dose rates of radiation; and
    an arithmetic section configured to convert a counting rate of electrical pulse signals, the counting rate having been counted by the counter, to a dose rate of radiation by using the database, wherein
    the phosphor contains an additive that emits photons when energy is applied, and
    the additive has a concentric concentration gradient.

2. The radiation monitor according to claim 1, wherein the phosphor has a spherical shape.

3. The radiation monitor according to claim 1, wherein the phosphor has a hemispherical shape.

4. The radiation monitor according to claim 1, wherein the phosphor has a cylindrical shape.

5. The radiation monitor according to claim 1, wherein the phosphor has a prismatic shape.

6. The radiation monitor according to claim 1, wherein the additive has the concentric concentration gradient in which concentration decreases outwards from a central portion of the phosphor.

7. The radiation monitor according to claim 1, wherein the additive has the concentric concentration gradient in which concentration increases outwards from a central portion of the phosphor.

8. The radiation monitor according to claim 1, further comprising:
    an optical filter that attenuates the light transmitted from the optical fiber, wherein
    the optical filter is interposed between the optical filter and the photodetector.

9. The radiation monitor according to claim 1, further comprising:
    at least one radiation detecting unit; and
    at least one optical fiber, whereby the radiation monitor includes at least a first optical fiber and a second optical fiber, wherein
    the arithmetic section is configured to convert to dose rates of radiation to a plurality of different positions.

10. The radiation monitor according to claim 9, further comprising:
    a light selecting device configured to select, as the light from which the photodetector is to acquire the electrical pulse signals, one of light transmitted from the first optical fiber and light transmitted from the second optical fiber, and
    a control section configured to control the light selecting device.

11. The radiation monitor according to claim 10, further comprising:
    an optical filter that attenuates the light, wherein
    the optical filter is interposed between the light selecting device and the photodetector.

12. The radiation monitor according to claim 10, further comprising:
    a plurality of optical filters, including at least a first optical filter and a second optical filter, to attenuate light, wherein
    the first optical filter is interposed between the first optical fiber and the light selecting device, and
    the second optical filter is interposed between the second optical fiber and the light selecting device.

13. A radiation monitor comprising:
    a radiation detecting unit including a phosphor that emits light responsive to incident radiation;
    an optical fiber that transmits the light emitted from the phosphor of the radiation detecting unit;
    a photodetector that converts single photons, the single photons making up the light transmitted from the optical fiber, to electrical pulse signals;
    a counter that counts the electrical pulse signals converted by the photodetector;
    a database configured to associate counting rates of electrical pulse signals with dose rates of radiation; and
    an arithmetic section configured to convert a counting rate of electrical pulse signals, which has been counted by the counter, to a dose rate of radiation by using the database, wherein
    the phosphor has a multilayer structure in which a characteristic of an additive differs in respective layers,
    the phosphor contains an additive that emits photons when energy is applied, and
    the additive has a concentric concentration gradient.

14. The radiation monitor according to claim 13, wherein the characteristic of the additive is an element species of the additive.

15. The radiation monitor according to claim 13, wherein the characteristic of the additive is a concentration of the additive.

16. The radiation monitor according to claim 13, wherein the characteristic of the additive is a density distribution of the additive.

* * * * *